(12) United States Patent
Schulz et al.

(10) Patent No.: US 7,789,373 B2
(45) Date of Patent: Sep. 7, 2010

(54) BALL POPPET VALVE WITH CONTOURED CONTROL STEM

(75) Inventors: Florian Schulz, Villingen-Schwenningen (DE); Gerd Strobel, Villingen-Schwenningen (DE)

(73) Assignee: Kendrion Binder Magnete GmbH, Villingen-Schwenningen (DE)

( * ) Notice: Subject to any disclaimer, the term of this patent is extended or adjusted under 35 U.S.C. 154(b) by 0 days.

(21) Appl. No.: 12/026,762

(22) Filed: Feb. 6, 2008

(65) Prior Publication Data
US 2008/0185551 A1    Aug. 7, 2008

(30) Foreign Application Priority Data
Feb. 7, 2007    (DE) .................. 10 2007 006 872

(51) Int. Cl.
*F16K 31/00*    (2006.01)
(52) U.S. Cl. .................. 251/339; 251/121; 251/83
(58) Field of Classification Search .................. 251/82, 251/83, 121, 339
See application file for complete search history.

(56) References Cited

U.S. PATENT DOCUMENTS

| | | | |
|---|---|---|---|
| 2,229,499 A | * | 1/1941 | Fisette .................. 188/112 R |
| 2,393,442 A | | 1/1946 | Yellott et al. |
| 2,851,007 A | * | 9/1958 | Kagan .................. 119/72.5 |
| 3,529,805 A | * | 9/1970 | Callahan, Jr. et al. .......... 251/88 |
| 3,791,413 A | | 2/1974 | Muller et al. |
| 4,721,284 A | | 1/1988 | Bankard |
| 6,418,967 B1 | | 7/2002 | Frei et al. .............. 137/625.65 |
| 6,497,246 B1 | * | 12/2002 | Nicewarner et al. .......... 137/413 |
| 6,708,725 B2 | | 3/2004 | Entwistle et al. |
| 7,201,188 B2 | * | 4/2007 | Baumann ................ 137/625.33 |
| 2005/0076955 A1 | | 4/2005 | Boehland et al. ............... 15/18 |

FOREIGN PATENT DOCUMENTS

| | | | |
|---|---|---|---|
| DE | 1 224 577 | 9/1966 | .................. 22/4 |
| DE | 1 229 354 | 1/1971 | |
| DE | 39 08 859 | 9/1990 | .................. 31/6 |
| DE | 44 19 168 | 12/1995 | .................. 1/30 |

\* cited by examiner

*Primary Examiner*—John K Fristoe, Jr.
(74) *Attorney, Agent, or Firm*—O'Shea Getz P.C.

(57) ABSTRACT

The invention relates to a ball poppet valve having a valve body, a cylindrical valve bore disposed in the valve body, a ball poppet for closing the valve bore and a movable control stem intruding into the valve bore. The control stem acts on the ball poppet, and the control stem has a diameter (d) that at least approximately becomes larger and larger in the direction towards the ball poppet.

20 Claims, 4 Drawing Sheets

BALL POPPET VALVE WITH CONTOURED CONTROL STEM

PRIORITY INFORMATION

This patent application claims priority from German Application No. 10 2007 006 872.9 filed Feb. 7, 2007, which is hereby incorporated by reference.

BACKGROUND OF THE INVENTION

The present invention relates to a ball poppet valve and in particular to a poppet valve that includes a control stem which along its longitudinal axis has a non-constant diameter.

Such ball poppet valves are generally known from the prior art and are employed as directional control valves or shutoff valves having a freely movable ball poppet as a shutoff element. Ball poppet valves are distinguished by simplicity of construction and a high degree of freedom from leakage and are therefore well suited to many applications.

FIG. 3 is a longitudinal section through a schematic depiction of a prior art ball poppet. Such a ball poppet valve comprises a valve body 1 in which there is made a cylindrical valve bore 3 that links an inlet 5 and an outlet 7 of the valve bore 3. At the inlet end the valve bore 3 opens into a valve aperture 9, which can be closed by a ball poppet 11. In order to provide heightened tightness or a required freedom from leakage, the valve bore 3 has at the inlet end a chamfer 13, which guarantees that ball poppet 11 seats in centered fashion on the valve aperture 9 and seals it in leak-free fashion. As a rule ball poppet valves are not pressure-balanced; that is, the pressure is higher at the inlet end than at the outlet end. Because of the higher pressure at the inlet end, the ball poppet 11 is pressed against the valve aperture 9; for this purpose, however, there can also be a compression spring 15 by whose spring force the ball poppet 11 is held on the valve aperture 9. For opening the valve there a control stem 17 is located in the valve bore 3, which adjoins the ball and is movable along its longitudinal axis X so that the ball poppet 11 can be lifted off the valve aperture 9 by a force directed toward the ball poppet 11. The control stem 17 can be fashioned for example as the armature of an electromagnetic actuating unit (not shown) so that the valve opens or closes in dependence on the current flowing through a coil of the actuating unit.

A maximal annular flow area $A_{max}$ is bounded by the control stem 17 disposed in the valve bore 3. This maximal flow area $A_{max}$ depends on the radius R of the valve bore 3 and the radius r of the control stem 17 and is correspondingly calculated as the difference in cross-sectional area between the valve bore 3 and the control stem 17 according to equation 1 as follows:

$$A_{max}=(R^2-r^2)\pi \quad (1)$$

wherein R is the radius of the valve bore 3, r is the radius of the control stem 17 and π is the ratio of the circumference of a circle to its diameter.

In a ball poppet valve according to the prior art, control action is achieved in that an annular flow area A released between the ball poppet 11 and a control edge 19 on the valve aperture by lifting of the control stem 17 is smaller than the maximal flow area $A_{max}$ bounded by the control stem 17 and the valve bore 3. Only an inadequate control action can be achieved with ball poppet valves according to the prior art, however, because this flow area A between the ball poppet 11 and the control edge 19 attains the maximal flow area $A_{max}$ when the ball poppet 11 is lifted even very slightly.

A problem with ball poppet valves known from the prior art is that, because of their structural form, they enable a relatively large flow when the ball poppet is lifted even a relatively small amount off the valve aperture. Electromagnetically actuated ball poppet valves for example exhibit a large flow for even a small current flowing in an exciter coil. In electromagnetically controlled ball poppet valves of the kind identified above, this relationship manifests itself in a steep Q-I characteristic (flow-current characteristic) and has the disadvantage that only slight control of the flow is possible with such a ball poppet valve.

Gate valves are also known wherein the ports are connected to or separated from one another by a sliding element, the so-called gate. The movement of the gate here can be axial or rotational, a flow control action being achieved with individual chambers or channels. Gate valves are characterized by good control behavior and, in the example of electromagnetic actuation, by a flat Q-I characteristic. Such gate valves have the disadvantage that 100% freedom from leakage cannot be achieved because of manufacturing tolerances and the functional construction of the valves.

Also known from the prior art, for example from U.S. Pat. No. 6,418,967, are pressure control valves wherein the inflow or outflow behavior of a medium through a valve aperture is controlled by conical control elements. These valves also have the disadvantage that the conical elements employed therein do not ensure complete freedom from leakage.

There is a need for a ball poppet valve that exhibits both a high degree of freedom from leakage and a configurable control characteristic. In the case of electromagnetically actuated ball poppet valves in particular, the flow-current characteristic should be adjustable over a wide range.

SUMMARY OF THE INVENTION

A ball poppet valve comprises a valve body, a cylindrical valve bore disposed in the valve body, a ball poppet for closing the valve bore and a movable control stem intruding into the valve bore. The control stem acts on the ball poppet, and the control stem has a diameter that at least approximately becomes larger and larger toward the ball poppet. An advantage of the invention is that a hydraulic cross section to be controlled not only depends on how far the ball poppet of the ball poppet valve is lifted off the valve body, but is controlled by a variable clearance between the control stem and a circumferential control edge of the valve aperture. The flow cross section thus depends on the form of the control stem, which can be shaped in approximately arbitrary fashion. The control stem can for example be shaped so that its diameter increases in linear or piecewise linear fashion or according to a continuous or piecewise continuous function. These forms of fashioning, approximately arbitrary within the stability limits of the material employed, make it easy to model the required control characteristics.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
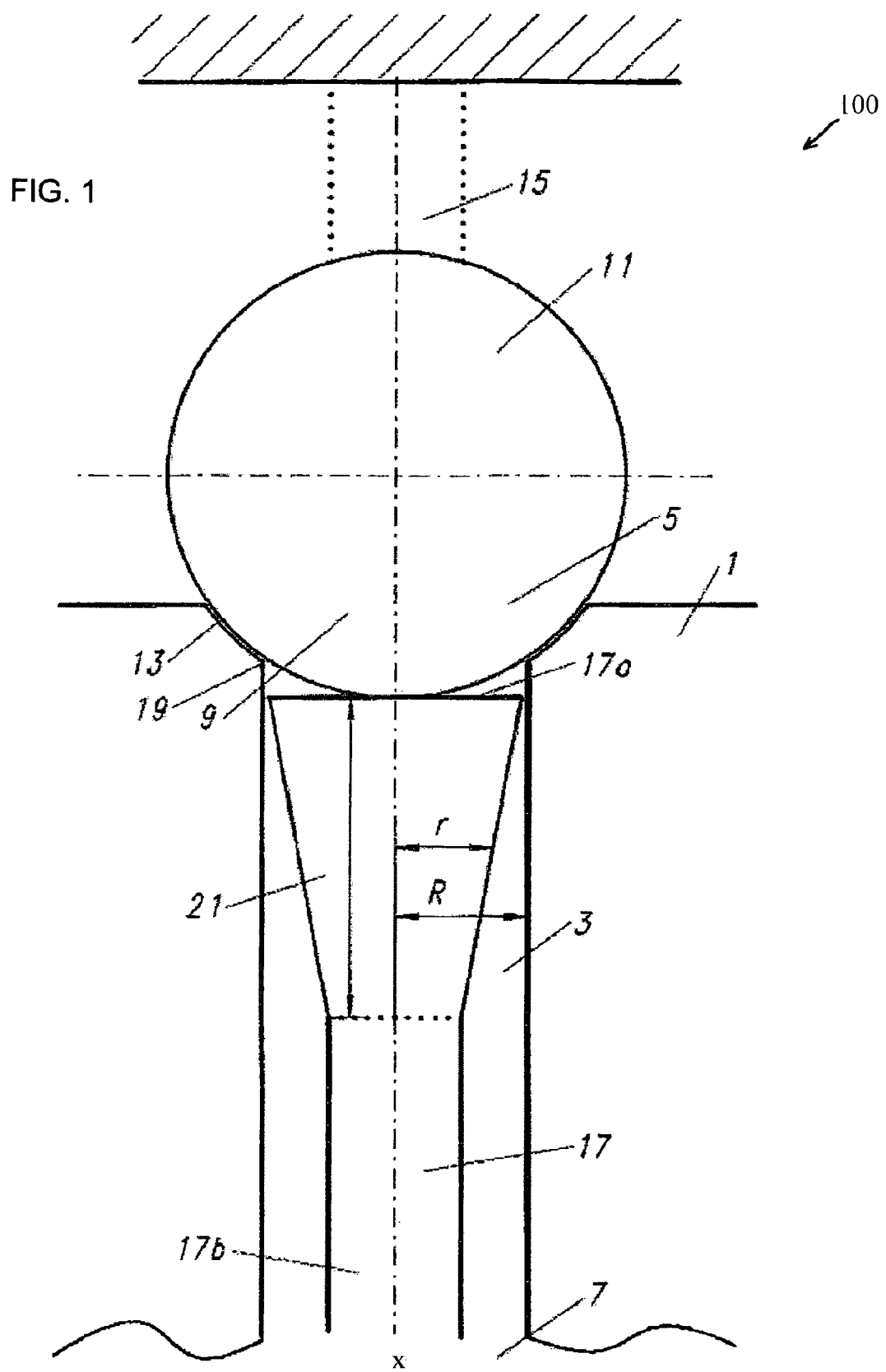
FIG. 1 is a cross-sectional illustration of a ball poppet valve according to the invention.

FIG. 1 is a cross-sectional illustration of a ball poppet valve 100.

Figure 3:
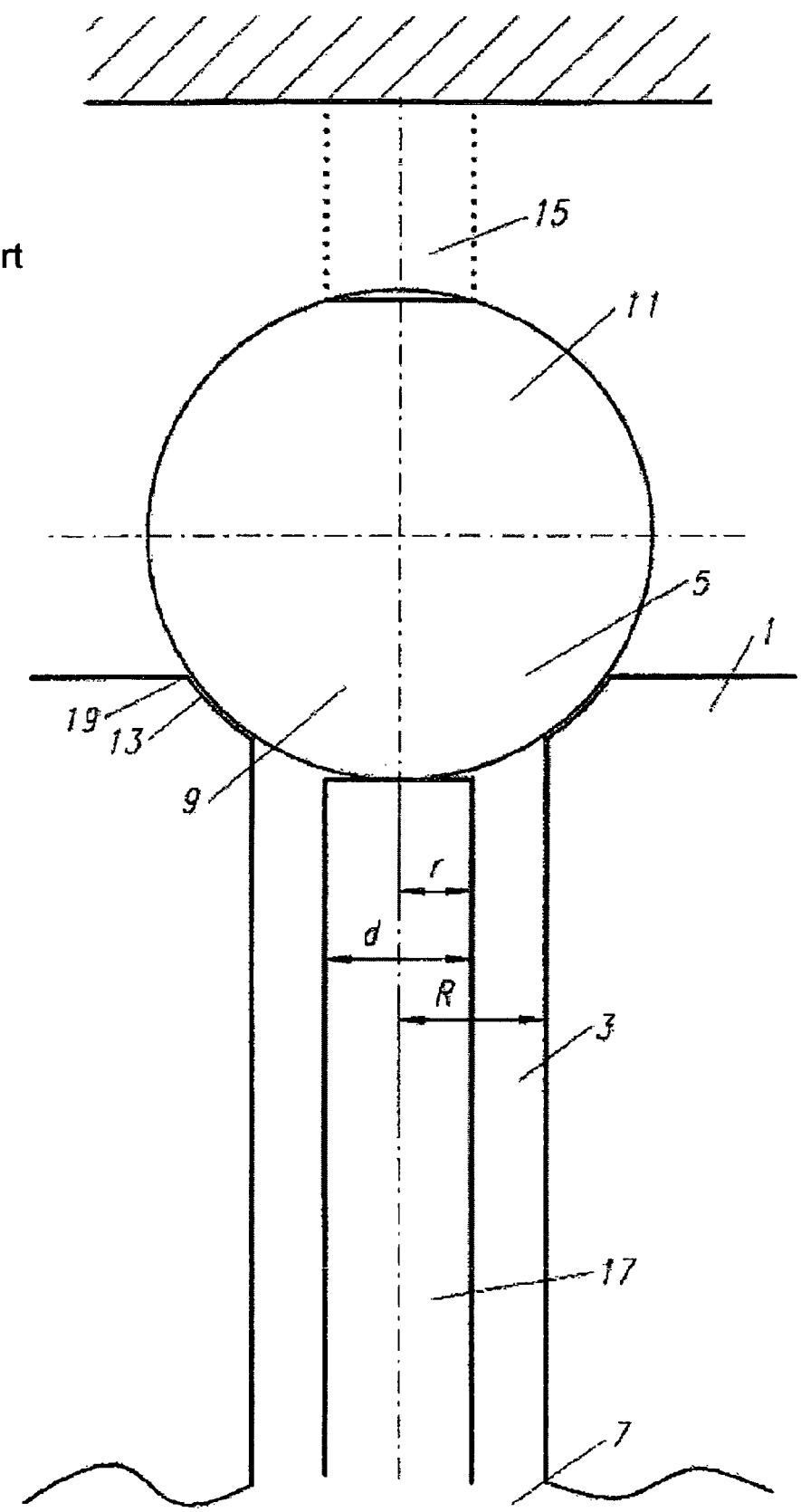
FIG. 3 is a cross-sectional illustration of a prior art ball poppet valve.
Figure 5:
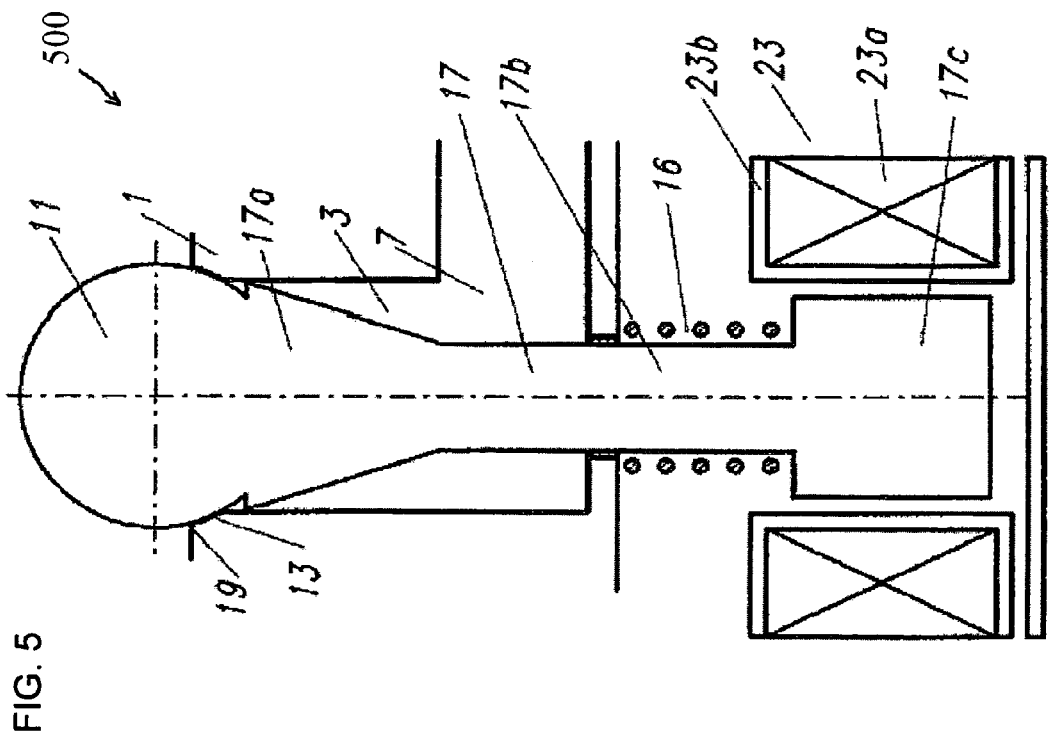
FIG. 5 is a cross-sectional illustration of yet another embodiment of the invention.
Figure 4:
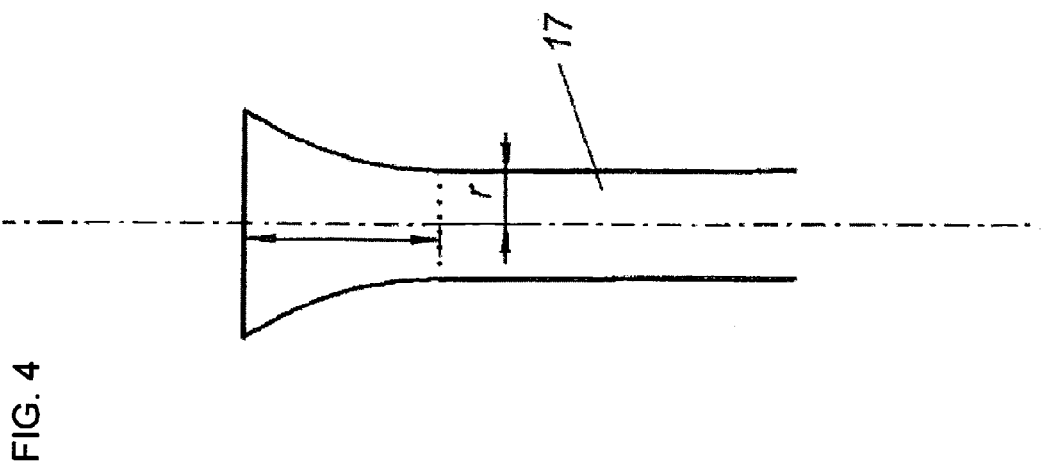
FIG. 4 illustrates a control stem having a cross section increasing according to a continuous function.

As can be seen from FIG. 1, the ball poppet valve 100 differs from the prior art of FIG. 3 in having a control stem 17 whose radius r or diameter d becomes larger and larger toward the ball poppet 11. Radius r or diameter d can for example increase in linear fashion or according to a continuous function as depicted in FIG. 4. At its discharge end/proximal end 17b facing away from the ball poppet 11, the control stem 17 is fashioned with a constant radius r, as known from the prior art, and in a control section 21 facing toward the ball poppet 11 and at a distal end of the control stem 17 exhibits an increasingly large radius r. The control section 21 extends over a control length l, which, when the ball poppet valve is operated, bounds a maximal lifting in which a control action can be achieved. It can also be seen from FIG. 1 that the control edge 19 sits at the end of the chamfer 13 facing toward the valve bore 3. As depicted in FIG. 5, the ball poppet 11 can also be formed integrally onto the control stem 17.

Figure 2C:
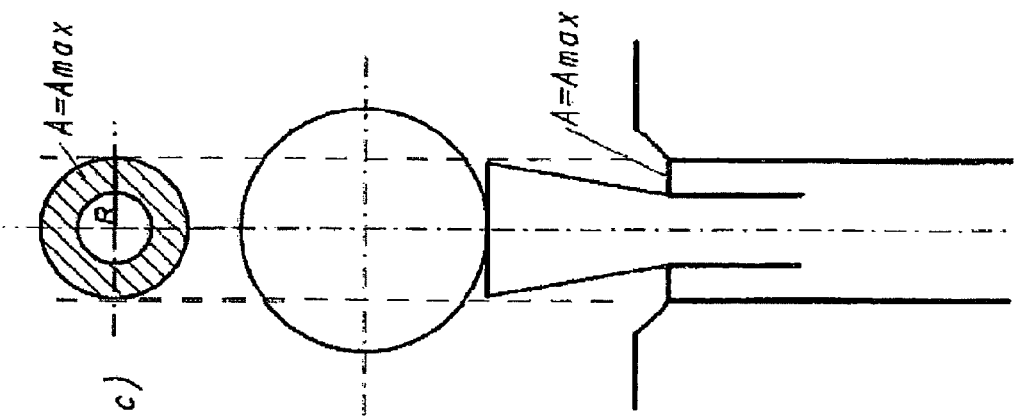
FIGS. 2A-2C illustrate the ball poppet valve of FIG. 1 in various opening positions as well as the flow cross section in each case.
Figure 2B:
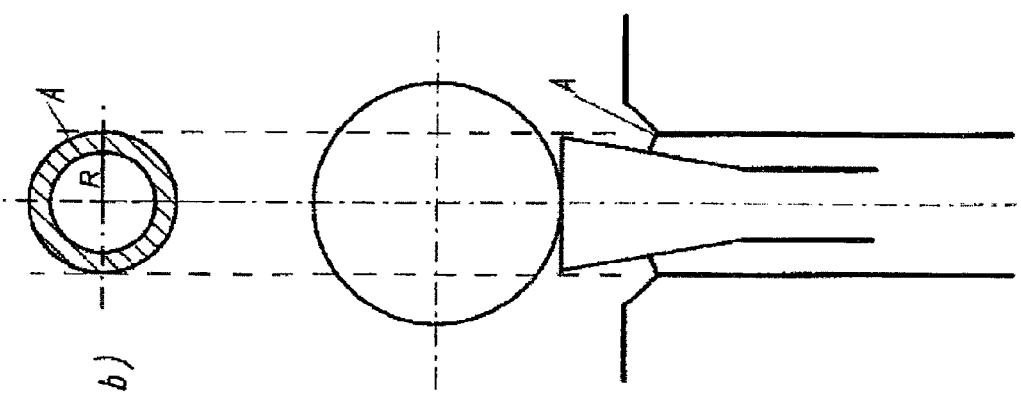
Figure 2A:
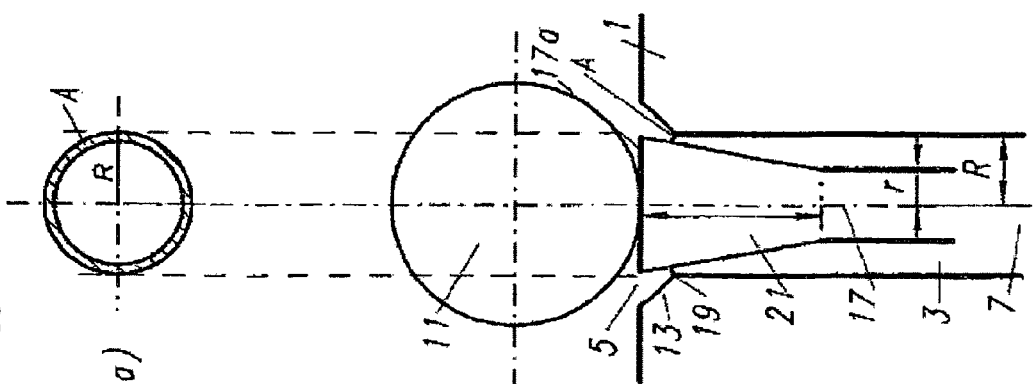

FIGS. 2A-2C illustrates the valve 100 illustrated in FIG. 1 in various opening positions, respectively, the flow area A released in each respective opening state being depicted in a top view above the valve in question. The width of flow area A released in each case is determined by the minimal clearance between the surface of the control stem 17 and the control edge 19. This clearance may be determined graphically by a perpendicular to the surface of the control stem 17 ending at the control edge 19. As can be seen from FIGS. 2A-2C, appropriate shaping of the control stem 17 thus makes it possible to model the characteristic of the valve.

As can be seen from FIGS. 2A-2C, controlling flow cross section A is no longer determined by the annular area between the ball poppet 11 and the control edge 19, but is now bounded by the surface of the control stem 17 and the control edge 19. As can be seen from FIGS. 2A-2C, a control action by the contour of the control stem 17 commences as soon as one end 17a of the control stem 17 facing toward the ball poppet 11 exits from the valve bore 3 at the height of the control edge 19 because of lifting of the control stem 17, and thus released flow area A is altered in its size by the varying radius r of the control stem 17. As soon as the control stem 17, as depicted in FIG. 2c, protrudes above the control edge 19 of the valve bore 3 by more than control length l of the control section 21, a maximum flow area $A_{max}$ is attained and no further enlargement of flow area A is possible.

Ball poppet valve 500 depicted in FIG. 5 differs from what is depicted in FIG. 1 in having a ball poppet formed integrally on the control stem 17 and a tension spring 16 disposed on the control stem 17 at the outlet end. The tension spring holds the valve closed when there is no current flowing through the electromagnetic actuating unit 23. The tension spring 16 is disposed between armature 17c and the bottom of the valve body 1. As illustrated in FIG. 5, the electromagnetic actuating unit 23 generally comprises an armature 17c, which is integrally formed on the control stem 17, and a coil 23a, which sits on a coil support 23b. When current flows, the coil 23a generates a magnetic field that acts on the armature 17c and thus moves the control stem 17.

What is claimed is:

1. A ball poppet valve comprising: a valve body, a cylindrical valve bore disposed in the valve body, a ball poppet for controllably opening and closing a bore aperture of the valve bore and a movable control stem within the valve bore operable to move the ball poppet, wherein at a distal end the control stem adjacent to the ball poppet the control stem has a diameter that increases defining a continuously tapered surface along a longitudinal axis of the movable control stem in a direction toward the ball poppet, where the distal end of the control stem extends through the bore aperture when the ball poppet valve is in an open position.

2. The ball poppet valve of claim 1, wherein the valve bore comprises a circumferential control edge along a valve aperture at the ball end.

3. The ball poppet valve of claim 2, wherein a flow cross section of the ball poppet valve is bounded by the circumferential control edge and a circumferential annular surface of the control stem.

4. The ball poppet valve of claim 1, wherein the diameter of the at least one section of the control stem increases in linear fashion.

5. The ball poppet valve of claim 1, wherein the diameter of the at least one section of the control stem increases according to a continuous function.

6. The ball poppet valve of claim 1, comprising a spring disposed on a side of the ball poppet lying opposite the control stem.

7. The ball poppet valve claim 6, comprising an electromagnetic actuating unit for moving the control stem.

8. The ball poppet valve of claim 1, wherein the ball poppet is formed integrally with the control stem.

9. The ball poppet valve of claim 8, wherein a tension spring or a compression spring is disposed at the outlet end of the control stem.

10. The ball poppet valve of claim 6, where the spring comprises a compression or tension spring.

11. A ball poppet valve, comprising:
a ball poppet;
a valve body that provides a valve bore having a bore aperture that is controllably opened and closed by the ball poppet; and
a control stem configured and arranged to controllably move along the valve bore, where the control stem comprises a distal end and a proximate end where the distal end is located adjacent to the ball poppet and the control stem includes a first lengthwise segment located at the proximate end and having a fixed diameter and a second lengthwise segment that has a continuously expanding diameter moving lengthwise along the control stem towards the distal end of the control stem adjacent to the ball poppet, where the distal end of the control stem is operable to extend through the bore aperture.

12. The ball poppet valve of claim 11, where the ball poppet and the control stem are formed from a single unitary piece.

13. The ball poppet valve of claim 11, comprising an electromagnetic actuating unit that applies a force to the control stem to open the valve bore to flow.

14. The ball poppet valve of claim 13, comprising a spring that provides a force on the control stem that biases the control stem such that the bore aperture is nominally closed.

15. The ball poppet valve of claim 11, where side walls of the second lengthwise segment expand outwardly from an axial center line of the control stem that is located co-axially within the valve bore in a direction closer to the distal end than the first lengthwise segment.

16. The ball poppet valve of claim 11, where in an axial direction along the second lengthwise segment of the valve stem the cross sectional area of the valve stem increases approaching the distal end.

17. A ball poppet valve, comprising:

a ball poppet;

a valve body that provides a valve bore having a bore aperture; and a control stem configured and arranged to controllably move along the co-axial valve bore, where the control stem comprises a distal end and a proximate end where the distal end is affixed to the ball poppet and the control stem includes a first lengthwise segment located at the proximate end having a constant cross sectional area and a second lengthwise segment that has an continuously increasing cross sectional area diameter moving lengthwise along the control stem to the distal end of the control stem, where the distal end of the control stem is operable to extend through the bore aperture.

18. The ball poppet valve of claim 1, where the section of the control stem having the increasing diameter is configured with the cylindrical valve bore to selectively increase or decrease flow area therebetween.

19. The ball poppet valve of claim 1, where the section of the control stem having the increasing diameter is disposed adjacent to the ball poppet.

20. The ball poppet valve of claim 11, where the second lengthwise segment is configured with the valve bore to selectively increase or decrease flow area therebetween.

* * * * *

UNITED STATES PATENT AND TRADEMARK OFFICE
CERTIFICATE OF CORRECTION

PATENT NO. : 7,789,373 B2  Page 1 of 1
APPLICATION NO. : 12/026762
DATED : September 7, 2010
INVENTOR(S) : Schulz et al.

It is certified that error appears in the above-identified patent and that said Letters Patent is hereby corrected as shown below:

Column 4
Line 6, after "end" insert --of--

Column 5
Line 2, delete "valve" and insert --control--
Line 3, delete "valve" and insert --control--

Signed and Sealed this

Nineteenth Day of October, 2010

David J. Kappos
*Director of the United States Patent and Trademark Office*